United States Patent Office 3,302,413
Patented Feb. 7, 1967

3,302,413
CAISSON HANDLING APPARATUS
Arden L. Burnett, 619 Nicholson Ave.,
Falls Church, Va. 22044
Filed Feb. 26, 1964, Ser. No. 347,619
13 Claims. (Cl. 61—64)

The invention described herein may be manufactured and used by or for the Government of the United States of America for governmental purposes without the payment of any royalties thereon or therefor.

The present invention relates to improvements in drydocking operations, and more particularly, relates to a system for hauling, manipulating and seating and unseating a caisson in the entrance to a dry dock, by remote control.

In previous drydocking operations it has been necessary to employ a large number of attendants, typically about 18 or more for hauling, operating the pumps, capstans and seating the caisson in a dry dock entrance. The same manpower is required to unseat the caisson in order to free a vessel to open water. One or more of the attendants are required to manually control the water level in the caisson, and the remainder are required to handle the lines and having capstans for bringing or warping the caisson from its berth to a proper position for sinking it into its seat to seal the dry dock entrance. The positioning of a dry dock caisson in the foregoing manner is laborious, time-consuming and costly.

The inefficiency of the prior drydocking operations is overcome by the present invention which in one arrangement provides adjacent the dry dock entrance a U-shaped channel or track, for guiding the caisson. This track or channel may be formed of block members or pilings. Another arrangement may be used whereby the guiding channel or track may be formed of one row of piling outboard of the quay wall or wharf where one side of the caisson is held in proper alignment at its bottom by a single row of pilings while the opposite side of the caisson slides along the quay wall. A system of remotely controllable pumps and valves is employed for controlling the buoyancy of the caisson. Remotely controllable reciprocating means are provided for moving the caisson into a proper position for seating the caisson, thereby sealing the dry dock entrance. With the arrangements provided by the present invention, only one attendant may be needed for controlling the maneuvering of the caisson into or out of its seat. Also, much less time is needed for positioning the caisson and sealing the dry dock. The arrangement also reduces manpower with an appreciable savings in cost.

It is, therefore, among the objects of the present invention to provide an improved dry dock caisson seating system; to provide a completely automatic caisson maneuvering system for seating and removing a caisson; and to provide a simple and efficient caisson maneuvering system controllable from a single remote station and a less costly operation in seating or unseating a caisson and an operation that reduces the time required to seal a dry dock entrance.

Other objects attendant features and advantages of the present invention will be better understood by reference to the following description and to the accompanying drawings in which like reference numerals indicate like parts and in which.

Figure 1:
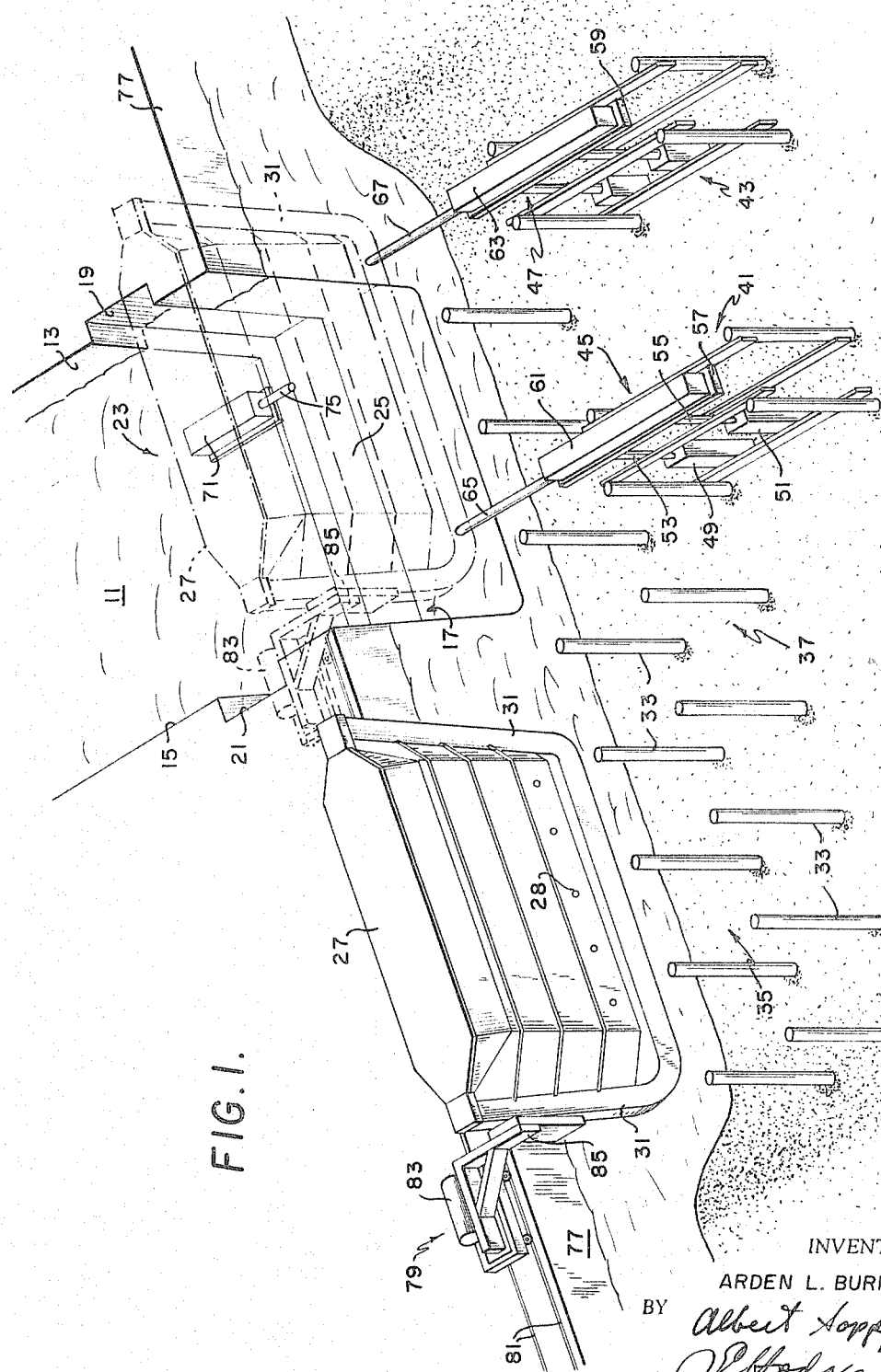
FIG. 1 is a view in perspective of a dry dock and caisson seating arrangement according to one version of the present invention.

Referring to the drawings, and to FIG. 1 in particular, a dry dock 11 has respective parallel opposing walls 13 and 15 opening onto a dry dock entrance 17. Near the entrance 17 the wall 13 has a recess or groove 19 located opposite a groove 21 located in the wall 15. The grooves 19 and 21 are canted inwardly so that they converge downward and in general follow the tapered edge of the caisson.

Figure 3:
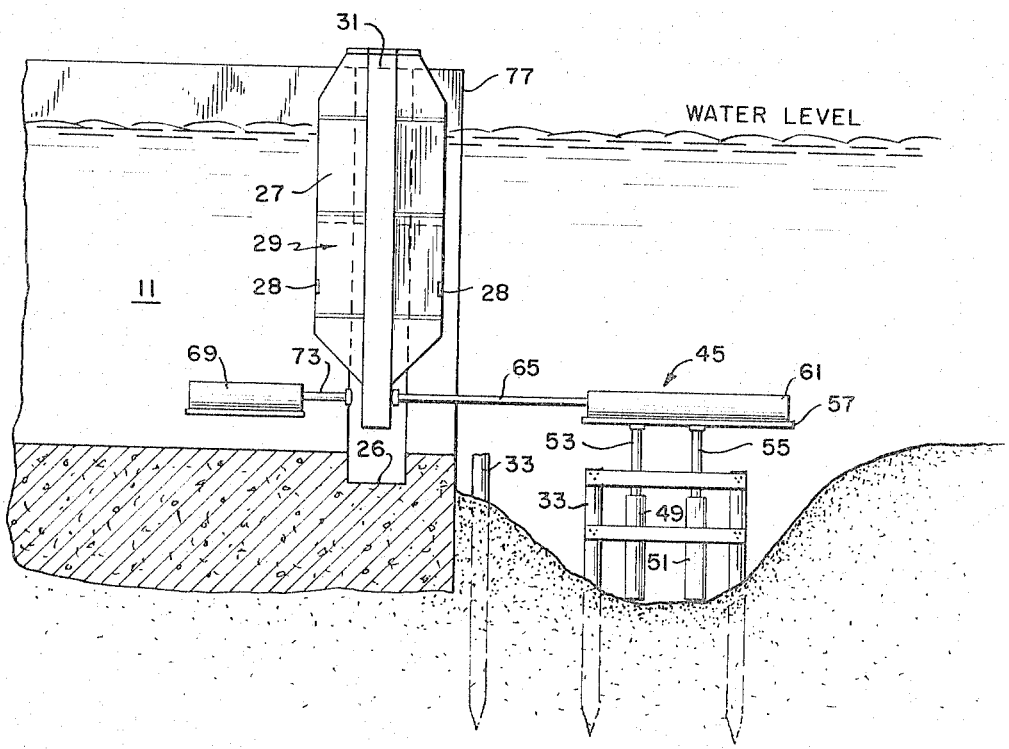
FIG. 3 is a view in elevation depicting a caisson seating arrangement according to the present invention.

As best seen in FIG. 3, the dry dock 11 has a floor 23 in which is located a transverse recess or groove 25 the extremities of which are in register with the bottom of the respective converging wall grooves 19 and 21. All of the grooves 19, 21 and 25 are rectangular in cross section and equal in width.

The grooves 19, 21 and 25 together form a trapezoidally shaped caisson seat 26 in the form of a recess or groove of constant width. A tapered caisson 27 fits into the seat 26 and has remotely controllable flood control valves 28 controlling a water-containing hollow lower portion 29. The hollow portion 29 is bounded on its sides and bottom by a narrower flange portion 31 and shown in FIG. 3. As best shown in FIGS. 1 and 3, the flange portion 31 has a trapezoidal outline and is rectangular in transverse cross section and of a transverse width less than that of the seat 26.

The flange portion 31 has a trapezoidal outline complementary with the grooves of the seat 26, so that when the caisson 27 is brought to rest on the seat 26 and is biased from in front or in back by water, the flange 31 is in intimate sealing contact with at least one side of the groove forming the seat 26.

Figure 2:
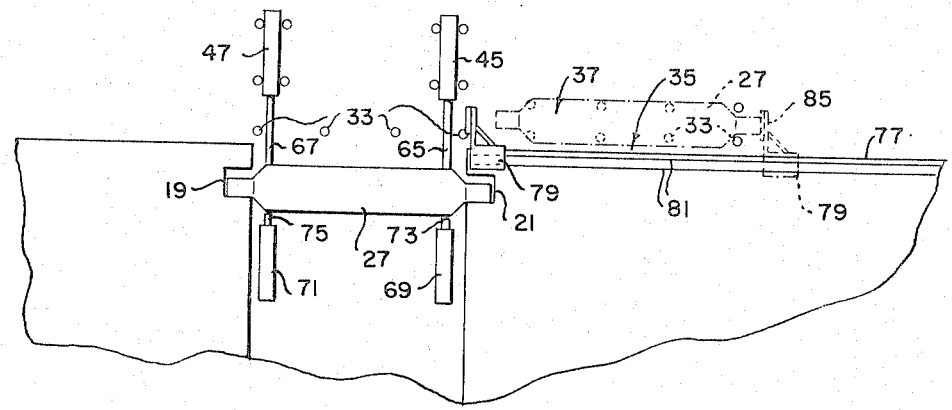
FIG. 2 is a view in plan of the arrangement of FIG. 1 in simplied form.

As shown by the different views of FIGS. 1–3, means provided for guiding and manipulating the movements of the caisson are composed of a plurality of pilings 33 arranged in two parallel rows 35 and 37 extending from in front of the drydock opening 17 laterally offset to at least one caisson length to the side of the drydock. The pilings 33 are located at a sufficient depth in front of the drydock opening 17 so as not to interfere with ships passing thereover into the dry dock.

A second plurality of pilings includes two parallel groups 41 and 43 each approximately in line with the respective sides of the opening 17. The piling groups 41 and 43 each protectively surround respective hydraulic ram units 45 and 47. The ram units 45 and 47 may be identical in construction. Each of the ram units 45 and 47 is composed of a pair of upright foundation pilings 49 and 51 in each of which is telescopingly mounted respective hydraulically operated vertically reciprocating rods 53 and 55. Any suitable pump means and conduit means therefor may be employed for operating the rods 53 and 55. For example, said pump and conduit means may be located as self-contained remote-controlled units in each of the supports 49 and 51.

Mounted on top of each pair of the rods 53, 55 are pallets 57 and 59 for the respective ram units 45 and 47. The respective pallets 57 and 59 provide support for respective horizontal hydraulic rams 61 and 63 having reciprocating piston rods 65 and 67.

The hydraulic means for operating the rams 61 and 63 may be remotely controlled self-contained units of suitable known design.

Another pair of vertically adjustable, horizontally reciprocating hydraulic rams 69 and 71 having rods 73 and 75 are mounted in the interior of the drydock in opposing relation to the respective units 45 and 47. The rams 69 and 71 may be operated in a manner similar to that of the units 45 and 47.

The rams 61 and 63 when in lowered position, may be substantially at or below the level of the floor of the drydock to ensure that they will not interfere with the passage of a ship thereover in entering or leaving the drydock. However, it is apparent that the rams 61 and 63 may be disposed sufficiently well to the sides of the drydock entrance so that they will not interfere with ship movements into or out of the drydock even though they may be disposed somewhat above the level of the floor of the drydock when they are not in a raised condition.

Figure 4:
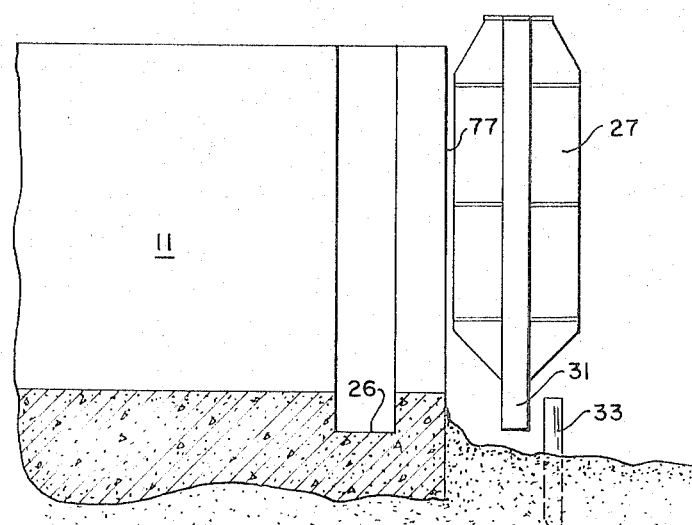
FIG. 4 is a view in elevation showing the caisson track according to an alternate arrangement whereby one row of piling outboard of the quay wall or wharf serves as the guiding track.

The flat exterior quay or wall of the dry dock is indicated by the reference numeral 77. As best seen in the different views of FIGS. 1 and 2, the caisson 27 before being seated is preferably positioned adjacent the wall 77 and off to the side of the entrance 17 with its flange 31 floating above the rows of pilings 35 and 37. The caisson is thus in its stowed position and ballast tanks in the caisson have been partially emptied of water causing the caisson to ride high in the water while not in use. The caisson 27 is moved to a position in front of the opening 17 by means of a carriage 79 mounted on a track 81 located on the top of the quay or wall 77. The carriage 79 may be self-propelled by a motor 83 or driven by any other suitable means. The carriage 79 is preferably remote controlled. The carriage 79 has mounted thereon an arm 85 which extends beyond the quay or wall 77 for intimate pushing and pulling contact with the caisson 27. If desired, the arm 85 may be fitted with a grapple, or magnet or any other suitable means (not shown) for attachment or securing to the upper end of the caisson flange 31. As shown in FIG. 4, if desired only one row of pilings 33 may be employed along the quay or wall 77 for guiding the flange 31 of the caisson 27. The arrangement of FIG. 4 is otherwise in the same manner as that of FIGS. 1–3.

Figure 5:
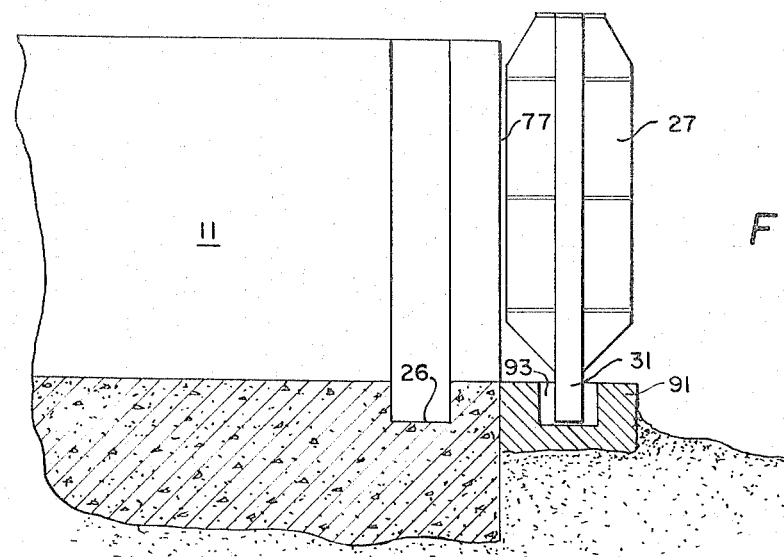
FIG. 5 shows a view of the caisson channel or track constructed outboard of the entrance to the dock and in proper alignment.

In the embodiment shown in FIG. 5, different caisson guiding means is employed. Specifically, instead of pilings, a floor track 91 is mounted on the wall or quay 77. The floor track may be formed of one or more blocks or frame members. The floor track 91 has a groove 93 by which the caisson flange 31 is guided for movement along the quay 77 to the drydock entrance 17. The caisson 27 may be moved in the groove 93 by hand or preferably by a remotely controllable motor mounted on a carriage, such as the carriage 79.

Before operations, the caisson 27 is moored in its position alongside the quay or wall 77 with its stem 31 above the track of piling.

After the ship is positioned in the dry dock, the caisson filling valves 28 are opened causing the flange 31 to sink in between the rows of pilings forming the caisson track. Valves 28 are then closed and the carriage 79 is actuated to push the caisson 27 endwise to a position adjacent to and in register with the entrance 17. The caisson is guided by the pilings 33 in rows 35 and 37, which form a slot or channel for the caisson or if desirable only one row of pilings may be installed. Sufficient water is pumped out of the trapezoid shaped caisson 27 so that it rides high enough in the water to enable its narrower bottom portion to pass thru the entrance 17 and its flange 31 to lie above the track formed by the pilings and clear of the tops of the pilings.

The hydraulic lifting rams of the units 45 and 57 are then actuated to lift the horizontal rams 61 and 63 high enough so that the rods 65 and 67 may be brought in pushing contact with the lower part or flange portion 31 of the caisson 27 upon actuation of the horizontal ram units 61 and 63.

The rods 65 and 67 push the caisson 27 into position in registration with the seat 26 for seating therein. The ram units 69 and 71 located in the drydock may also be actuated to assist in positioning the caisson 27 over its seat 26.

When in its proper seating location, the caisson 27 is flooded by opening valves 28 preferably by remote control so that it sinks into the seat 26. During sinking of the caisson, the rods 65, 67, 73 and 75 are controlled to guide the caisson 27 into its seat 26. The caisson may be positioned against the outboard face of seat 26 if the water level within the dry dock is to be raised above the river level as explained in copending Patents 3,133,420 and 3,133,518, issued May 19, 1964. If desired, the caisson 27 may be seated in the inboard face of seat 26 to seal water out of the dock.

The reverse of the above-described operation takes place when the ship is removed from the dry dock. The dry dock 11 is flooded; the ballast water in the caisson 27 is pumped out enough to cause the caisson to float above seat 26; the rams 69 and 71 push the caisson 27 thru the opening 17. The ram units 45 and 47 may be employed to further locate the caisson 27 so that its flange 31 is positioned between the rows 35 and 37 of pilings 33. Ballast water is admitted to the caisson to lower it until its flange 31 is disposed in the track formed by the pilings 33. The rods 65 and 67 of the rams 61 and 63 are retracted and the rams are lowered. The carriage 79 is actuated so that arm 85 thereof pulls the caisson back to its inactive position adjacent the quay or wall 77, and the caisson is further dewatered causing its flange to ride above piling 33.

It is understood that as best seen in FIG. 3 the pilings are located so that ships passing into the dry dock 11 will easily pass over the pilings.

In that the rams 69 and 71 are located well to the sides in the dry dock 11, supports therefore (not shown) will not interfere with ship movements in the dry dock.

Obviously many modifications and variations of the present invention are possible in the light of the above teachings. It is therefore to be understood that within the scope of the appended claims the invention may be practiced otherwise than as specifically described.

What is claimed is:

1. Caisson handling apparatus for a dry dock, said dry dock having an entrance opening bounded by a front sea wall, and a caisson seat within the confines of the dry dock, said apparatus comprising:

caisson guide means located outside of the front sea wall and defining a caisson guiding channel extending laterally across the entrance opening of the dry dock and for a distance along the front sea wall;

means for moving the caisson endwise in said guiding channel to positions into and out of registration with the dry dock entrance opening; and further means including horizontally reciprocating means located outwardly in front of and movable toward and away from the dry dock entrance opening and adapted for engaging a face portion of the caisson and for moving the caisson through the opening to a position selectively into and out of registration with the caisson seat.

2. Apparatus according to claim 1 wherein said caisson guide means comprises a plurality of pilings forming said caisson guiding channel.

3. Apparatus according to claim 1 wherein said caisson guide means comprises block means having groove means therein for receiving and guiding the bottom of the caisson.

4. Apparatus according to claim 1 wherein said means for moving the caisson comprises a carriage movable on the seal wall; and arm means located on the carriage for pushing and pulling engagement with the caisson.

5. Apparatus according to claim 1 wherein said caisson seat is recessed and said caisson has an edge portion adapted to be received in said recessed seat.

6. Apparatus according to claim 1 wherein said horizontally reciprocating means movable toward and away from said dry dock opening is disposed for such reciprocating movement in a direction substantially at right angles to the said laterally extending caisson guiding channel and substantially at right angles to the plane of the dry dock entrance opening.

7. Apparatus according to claim 1 wherein said further means includes:
   a pair of support means spaced from each other in front of and disposed toward either side of the dry dock entrance opening; and
   ram means supported by said pair of support means;
   said rams means including said horizontally reciprocating means movable toward and away from the dry dock entrance opening.

8. Apparatus according to claim 7 including:
   ram means located inwardly of the caisson seat, said ram means having reciprocating elements engageable with the caisson for facilitating seating of the caisson, and further, for pushing the caisson outwardly through the dry dock entrance.

9. Apparatus according to claim 7 wherein each of said pair of spaced support means each support a ram means including a horizontally reciprocating element all disposed toward either side of the dry dock entrance opening and at sufficient depth whereby a ship may pass thereover to enter and leave the drydock.

10. Apparatus according to claim 7 wherein each of said pair of support means comprises upwardly and downwardly adjustable elements for raising and lowering said horizontally reciprocating means of said ram means.

11. Apparatus according to claim 10 wherein said upwardly and downwardly adjustable elements comprise hydraulic means.

12. Apparatus according to claim 10 wherein each of said pair of spaced support means each support one of said ram means including a vertically adjustable horizontally reciprocating element all disposed toward either side of the dry dock entrance opening and at sufficient depth when the horizontally reciprocating elements are in lowered position whereby a ship may pass thereover to enter and leave the dry dock.

13. Apparatus according to claim 10 including remotely controlled power means for operating said several means for moving the caisson and for operating said means for raising and lowering the horizontally reciprocating means of said ram means and for admitting and discharging water from the caisson.

References Cited by the Examiner

UNITED STATES PATENTS 566,734    9/1896    Boggs et al. _____ 61—64

FOREIGN PATENTS 298,301    1917    Germany.

CHARLES E. O'CONNELL, *Primary Examiner.*

JACOB SHAPIRO, *Examiner.*